E. H. Stearns,
Saw-Mill Head-Block.
N°. 52,904. Patented Feb. 27, 1866.

E. H. Stearns,
Saw-Mill Head-Block.
No. 52,904. Patented Feb. 27, 1866.
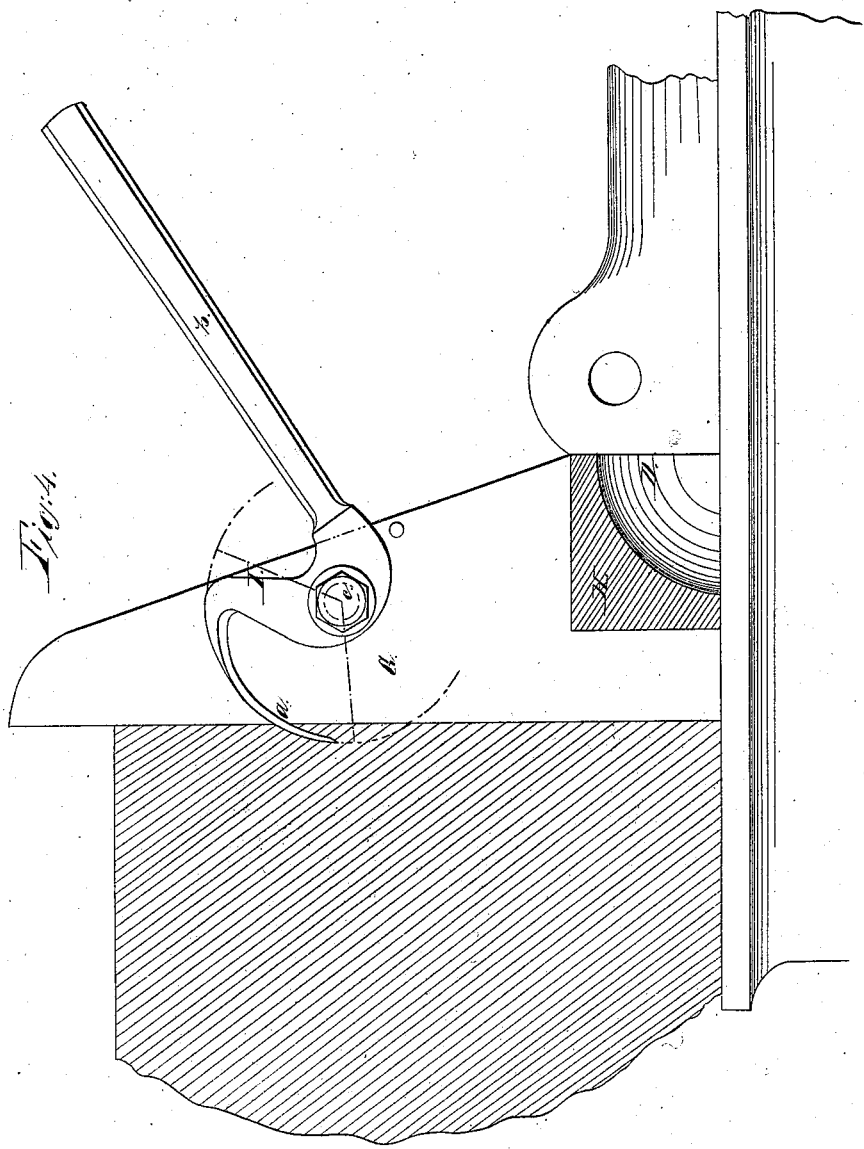

UNITED STATES PATENT OFFICE.

E. H. STEARNS, OF ERIE, PENNSYLVANIA.

IMPROVEMENT IN HEAD-BLOCKS FOR SAW-MILLS.

Specification forming part of Letters Patent No. 52,904, dated February 27, 1866.

*To all whom it may concern:*

Be it known that I, E. H. STEARNS, of Erie, in the county of Erie and State of Pennsylvania, have invented certain new and useful Improvements in Head-Blocks for Saw-Mills; and I do hereby declare that the following is a full, clear, and exact description thereof, which will enable those skilled in the art to make and use the same, reference being had to the accompanying drawings, forming part of this specification, in which—

Figure 1:
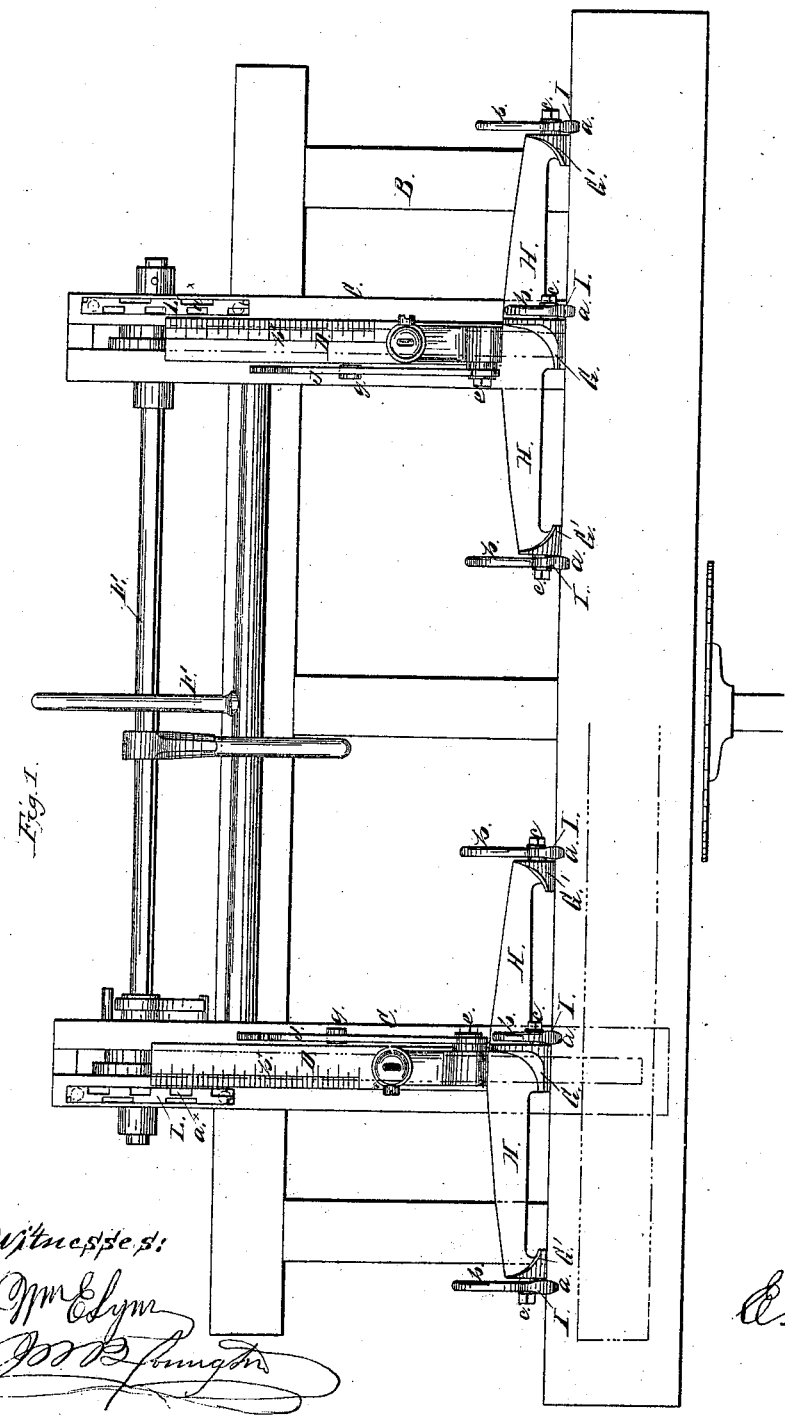
Figure 2:
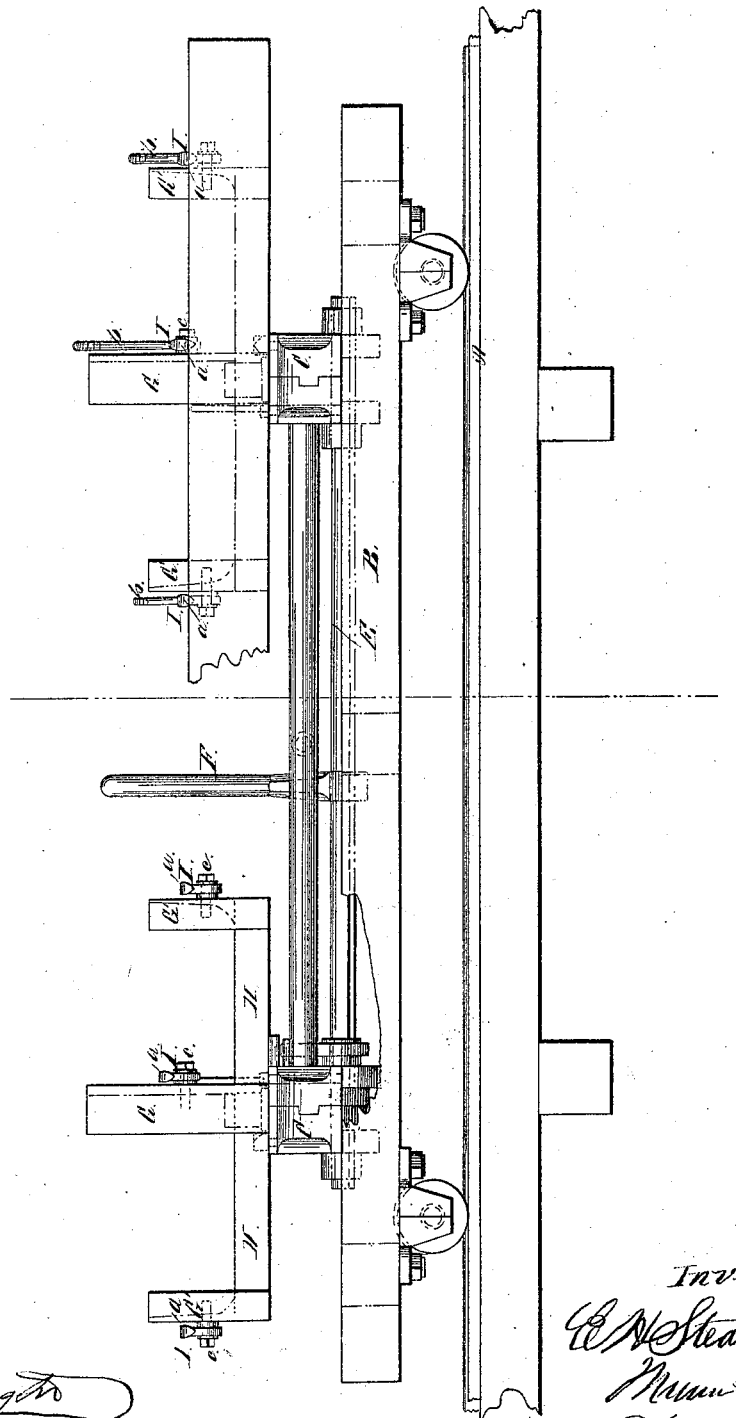
Figure 3:
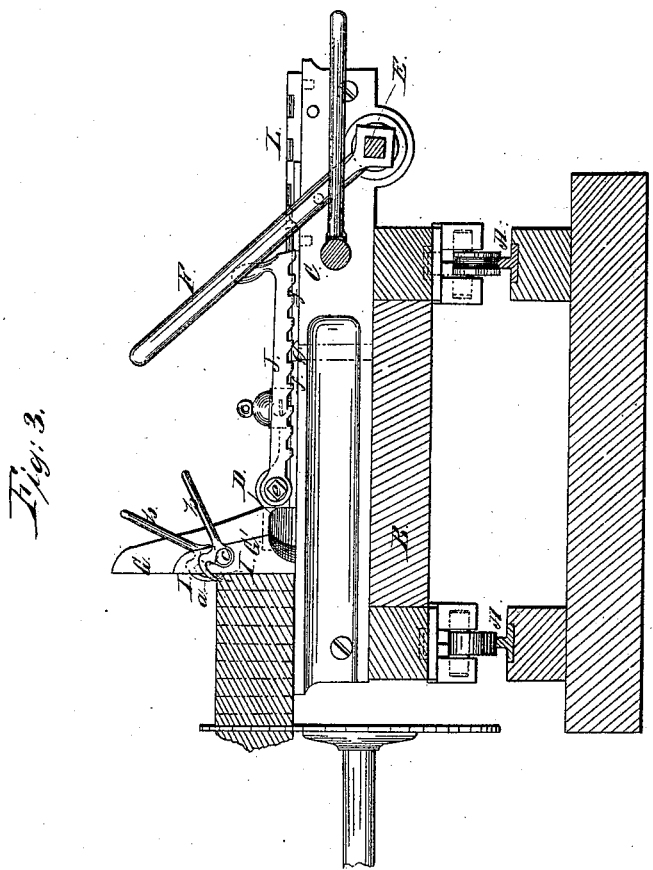

Figure 1, Sheet No. 1, is a plan or top view of my invention; Fig. 2, Sheet No. 2, a front view of the same; Fig. 3, Sheet No. 3, a side sectional view of the same taken in the line $x$ $x$, Fig. 2; and Fig. 4, Sheet No. 4, a detached and enlarged side view of a dog pertaining to the invention.

Similar letters of reference indicate corresponding parts.

This invention relates to certain new and useful improvements in head-blocks for saw-mills; and it consists, first, in the employment or use of supplemental posts or knees connected with wings or arms attached to the slides of the head-block, and all so arranged that the log, cant, or timber to be sawed will have a perfect bearing along its whole length at the side opposite to that where the saw cuts, and will consequently be prevented from springing under the action of the saw or under the gripe or pull of the dogs, a contingency of frequent occurrence with ordinary head-blocks when the log, cant, or timber being sawed is reduced or sawed to a thin piece so as to be easily bent, sprung, or deflected out of line with the plane of the saw, and which causes a considerable waste of timber or lumber, and great annoyance to the sawyer.

The invention consists, second, in the employment or use, in combination with a dog of peculiar construction, of a handle connected with the dog, or formed or forged out with it, in such a manner that the log, cant, or timber may be expeditiously dogged and undogged, and without the possibility of the ends or points of the dogs which penetrate the log, cant, or timber coming within the line of the saw-kerf, the saw being thereby prevented from being injured by coming in contact with the dogs, and the sawyer enabled to secure the log, cant, or timber on the head-block and detach it therefrom very expeditiously and with the greatest facility.

The invention consists, third, in the employment of notched bars attached to the slides of the head-block, and used in connection with stops applied to the heads, and arranged in such relation with the racks at the under sides of the slides, with which racks the feeding-pawls engage, that the log, cant, or timber to be sawed may be adjusted in such a position on the head-block as to insure the log, cant, or timber being sawed into the greatest possible number of merchantable boards of a given or equal thickness—a result due to the waste, if any, being taken off with the slab, as will be hereinafter fully shown and described.

The invention consists, fourth, in the employment or use of a gage, arranged in a novel way, as hereinafter set forth, whereby the accurate setting movement of the saw to the log, cant, or timber is insured, both as regards the sawing of the latter wholly into boards or planks of an equal or a uniform thickness, and also partially into boards or planks of an equal or uniform thickness, leaving a piece of timber of given dimensions, as will be hereinafter fully set forth.

A A represent the two parallel ways on which the carriage B runs, and C C are two metal heads placed transversely on the carriage B, and firmly bolted thereto parallel with each other. On the upper parts or tops of these heads C C there are placed slides D D, one on each head, said slides having a longitudinal groove at each side, in which the edges of the top plate of the slides fit, serving as guides for the slides, and the under surface of each slide is toothed to form a rack. Within the heads C C there are placed two pawls which engage with the racks of the slides, said pawls being connected with and operated by eccentrics on a shaft, E, the ends of which pass transversely through the heads. The shaft E is provided with a lever, F, for the convenience of turning it and operating the pawls, which, in consequence of engaging with the racks of the slides, move the same, and also the log, cant, or timber toward the saw. This mode of operating the slides is not new, the same having been previously invented and patented by me, the Letters Patent bearing date 15th April, 1856. A minute description of such parts is therefore unnecessary.

At the front end of each slide D there is an upright post or knee, G, and from the lower ends of these posts or knees horizontal arms or wings H extend, one from each side of each post or knee, the outer end of each arm or knee having an upright post or knee, G'. (See Figs. 1 and 2.) The posts or knees G G' of each slide are in line with each other, and the posts or knees of the two slides form bearing-surfaces at short distances apart the whole length of the log, cant, or timber to be sawed, the posts or knees of the two slides being adjusted in line with each other by adjusting the slides previous to the dogging of the log, cant, or timber to the posts or knee, the log, cant, or timber resting upon the heads C C, as usual.

By this arrangement a very important result is attained, the log being firmly retained in position so that it cannot be sprung when reduced or sawed down to a thin piece under the action of the saw, or bent out of a straight line under the pull or strain of the dogs. This bending or springing of the log, cant, or timber from the above causes, when sawed or reduced down to a thin piece or strip, is of quite common occurrence, and occasions the sawyer a great deal of trouble and inconvenience, and most generally the last few boards are imperfect and unmerchantable ones, even when the sawyer exercises care and operates with great caution in order to avoid such a contingency. This feature of the invention therefore effects a saving in stock and in time.

I represents the dogs by which the log, cant, or timber is secured to the posts or knees G G', each post or knee having a dog attached to it. These dogs are composed of two principal parts, one part, $a$, which may be termed the "tooth" or "claw," and the other part, $b$, which comprises the handle.

The form of the dogs is shown clearly in Figs. 3 and 4, more particularly in the latter. The dogs are secured to the posts or knees by means of fulcrum-bolts $c$, and the tooth or claw is bent in the form of a segment, it being the portion of a circle of which the fulcrum-bolt $c$ is the center, as shown clearly in Fig. 4, the arm $d$, which connects the tooth or claw $a$ with the handle $b$, being bent so that the bolt $c$ may pass through it and cause the tooth or claw $a$ to have a proper relative position with the handle.

In raising the handle $b$ the tooth or claw $a$ will enter the log, cant, or timber at the side which adjoins the posts or knees G G', the former being drawn snugly in contact with the latter, the tooth or claw entering the log, cant, or timber in the path of a circle, as clearly shown in Fig. 4.

The sweep of the tooth or claw $a$ is such as to be in all cases less than the thickness of the boards or stuff to be sawed, so that the tooth or claw cannot project within or to the line of the saw-cut. Hence the saw cannot come in contact with the tooth or claw and be injured thereby, and the sawyer will be enabled to dog the log, cant, or timber very expeditiously, and also to undog the same with the greatest facility, as the dogs are manipulated through the medium of the handles $b$. This feature of the invention is a very important one, especially when used in connection with my supplemental posts or knees, as six dogs are used, and if the old dogging devices were used considerable time would be consumed in dogging or undogging the log, cant, or timber.

Expedition in dogging or undogging is very important, as circular saws are now much used, and they work rapidly. Hence if a dogging device is used which cannot be quickly manipulated much time will be lost.

Each slide D has a bar, J, connected to it by a pivot-bolt, $e$, and the under sides of these bars are notched, as shown at $f$ in Fig. 3. These notches correspond with the teeth of the racks at the under sides of the slides D in such a manner that when either of the notches in said bars are fitted over a stop, $g$, on the heads C a tooth in the racks at the under sides of the slides will be in proper relation with a pawl by which the racks and slides are moved, and by adjusting the two bars J in the same position—that is to say, by having the same notch in each bar fitted over their stops $g$—the posts or knees of the two slides will be brought in line with each other.

The notched bars therefore effect two very important results—first, they insure the proper setting of the two slides D D so that the posts or knees may be brought in line with each other for the log, cant, or timber to bear against, and they insure the proper adjusting of the racks at the under side of the slides with the pawls, or with any other means which may be employed to move or actuate the slides.

In placing a log, cant, or timber on the heads C C, the slides D D are drawn back to admit of the log, cant, or timber, after being dogged to the posts or knees, presenting a sufficient portion to the saw to take off the slab or refuse part of such a width that the other portion of the log, cant, or timber may all be sawed into merchantable boards. This, it will be seen, is done without any difficulty whatever, for the log, cant, or timber is fed or set to the saw a certain distance at each movement of the slides D.

By referring to Fig. 3 a cant, K, is shown dogged to the posts or knees. This cant is divided off to show that it may be sawed into nine merchantable boards. It will be understood that it is not necessary for the sawyer to mark it off, or to ascertain its dimensions; it is merely marked in the drawings for illustration.

The slides D being drawn back and both set in a corresponding position and in a proper relative position with the pawls, it is obvious that if the slides D are moved a certain distance each time the cant is set to the saw and a slab or refuse piece sawed off from the log of the proper thickness, the rest will all be sawed up into merchantable boards. This refuse slab may not be sawed off at once—two cuts may be made—but the cant must be set to the saw for the second cut the same distance as if it were to be set for sawing a board; or, in other words, the setting movement of the slides is the same throughout, more or less refuse being taken off with the slab—the inferior and comparatively worthless part of the cant—and consequently there will be no waste at the opposite end of the cant, which bears against the posts or knees, and where the stuff is valuable.

In order to insure the proper movement of the slides, I attach gages L to the upper surfaces of the heads C, said gages being composed of bars notched, as shown at $a^\times$, the width of the notches and the projections or spaces between them being equal to the setting movement of the slides. The upper surfaces of the slides D are graduated, as shown at $b^\times$. By this means the sawyer can see at a glance whether any error has been committed in setting the log to the saw.

Having thus described my invention, what I claim as new, and desire to secure by Letters Patent, is—

1. The employment or use of supplemental posts or knees G', connected with the main posts or knees G by means of wings or arms H, arranged so as to form proper bearings for the log, cant, or timber throughout its entire length, substantially as and for the purpose specified.

2. The pivoted dog, consisting of the arc-shaped bit $a$ and the handled stock $b\ d$, constructed and operated substantially as described and represented.

3. The pivoted or hinged bars J, attached to the slides D, notched, as shown, in connection with the stops $g$, on the heads C, substantially as and for the purpose specified.

4. The bars J, in combination with the gages L and graduated slides D, substantially as and for the purpose set forth.

The above specification of my invention signed by me this 31st day of October, 1865.

E. H. STEARNS.

Witnesses:
WM. DEAN OVERELL,
M. M. LIVINGSTON.